United States Patent
Otsuka et al.

(10) Patent No.: US 11,379,169 B2
(45) Date of Patent: Jul. 5, 2022

(54) PRINTING APPARATUS AND METHOD FOR OPERATING PRINTING APPARATUS

(71) Applicant: SEIKO EPSON CORPORATION, Tokyo (JP)

(72) Inventors: Shingo Otsuka, Nagano (JP); Hiroatsu Fujisawa, Nagano (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 17/061,702

(22) Filed: Oct. 2, 2020

(65) Prior Publication Data
US 2021/0103414 A1    Apr. 8, 2021

(30) Foreign Application Priority Data

Oct. 2, 2019   (JP) .............................. JP2019-181964

(51) Int. Cl.
| | |
|---|---|
| *G06F 3/12* | (2006.01) |
| *G06F 9/54* | (2006.01) |
| *G06F 9/451* | (2018.01) |
| *G06F 3/14* | (2006.01) |

(52) U.S. Cl.
CPC .......... *G06F 3/1253* (2013.01); *G06F 3/1423* (2013.01); *G06F 9/453* (2018.02); *G06F 9/542* (2013.01)

(58) Field of Classification Search
None
See application file for complete search history.

(56) References Cited

U.S. PATENT DOCUMENTS

2007/0031141 A1*  2/2007  Tanaka ................. G02B 26/004
                                                                     396/287

FOREIGN PATENT DOCUMENTS

| JP | H058894 U | 2/1993 |
|---|---|---|
| JP | 2007320053 A * | 12/2007 |

* cited by examiner

*Primary Examiner* — Lennin R Rodriguezgonzalez
(74) *Attorney, Agent, or Firm* — Chip Law Group

(57) ABSTRACT

A printing apparatus includes a first screen facing in a first direction, a second screen facing in a second direction different from the first direction, and a processor that controls display of the first screen and display of the second screen. The processor performs control for displaying a first image on the first screen and, simultaneously, displaying a second image on the second screen. A first action of a user on which guidance is provided by the first image and a second action of a user on which guidance is provided by the second image are actions configured to be performed simultaneously.

6 Claims, 6 Drawing Sheets

PRINTING APPARATUS AND METHOD FOR OPERATING PRINTING APPARATUS

The present application is based on, and claims priority from JP Application Serial Number 2019-181964, filed Oct. 2, 2019, the disclosure of which is hereby incorporated by reference herein in its entirety.

BACKGROUND

1. Technical Field

The present disclosure relates to a printing apparatus and a method for operating a printing apparatus.

2. Related Art

A printer including operation panels disposed respectively at front and rear positions in which a different person is assigned to each of the front and rear operation panels such that two persons operate the operation panels is disclosed (refer to JP-UM-A-5-88940).

In some cases, the users perform different actions for one printing apparatus. For example, in the case where roll paper is set to a so-called large format printer, a user who is in front of the printer and a user who is behind the printer perform the respective necessary actions and set the roll paper in cooperation with each other. In such cases, it has been desired to make contrivances for improving the efficiency and accuracy of operations.

SUMMARY

A printing apparatus includes a first screen facing in a first direction, a second screen facing in a second direction different from the first direction, and a processor that controls display of the first screen and display of the second screen. The processor performs control for displaying a first image on the first screen and, simultaneously, displaying a second image on the second screen. A first action of a user on which guidance is provided by the first image and a second action of a user on which guidance is provided by the second image are actions configured to be performed simultaneously.

DESCRIPTION OF EXEMPLARY EMBODIMENTS

Figure 1:
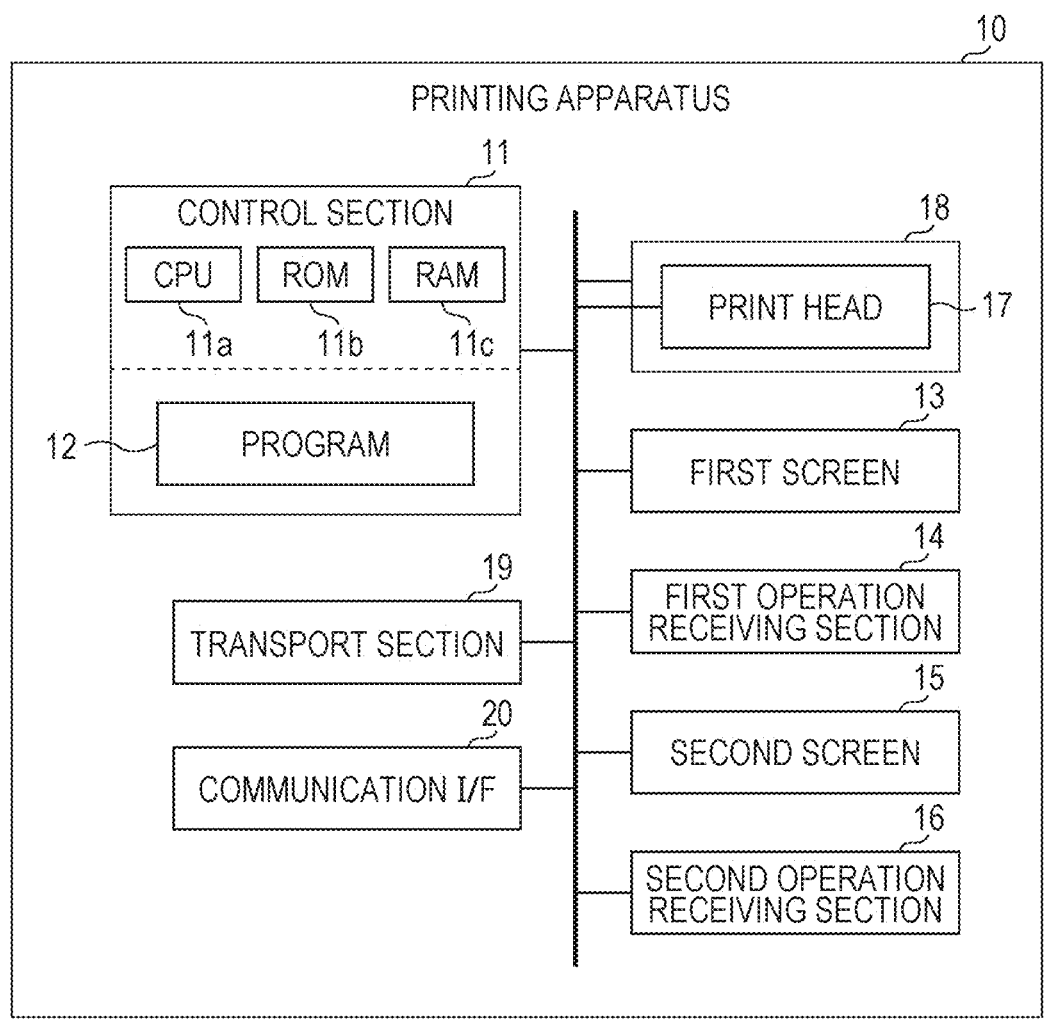
FIG. 1 is a block diagram illustrating a configuration of a printing apparatus.

Hereafter, an embodiment of the present disclosure will be described with reference to the accompanying drawings. The drawings are merely illustrative for describing the present embodiment. Since the drawing are illustrative, in some cases, the ratios and shapes are not accurate, the drawings are inconsistent with each other, and part of the drawings are omitted.

1. SCHEMATIC DESCRIPTION OF APPARATUS

FIG. 1 simply illustrates, by way of a block diagram, a configuration of a printing apparatus 10 according to the present embodiment. The printing apparatus 10 may be described as a recording apparatus, a liquid discharge apparatus, a printer, or the like. "A method for operating a printing apparatus" is implemented by the printing apparatus 10. The printing apparatus 10 includes a control section 11, a first screen 13, a first operation receiving section 14, a second screen 15, a second operation receiving section 16, a print head 17, a carriage 18, a transport section 19, and a communication interface (I/F) 20.

Interface is abbreviated to IF. The control section 11 includes an integrated circuit (IC), which includes a central processing unit (CPU) 11a as a processor, a read-only memory (ROM) 11b, a random-access memory (RAM) 11c, and the like, other nonvolatile memories, and the like.

In the control section 11, the processor, or the CPU 11a, executes computations according to a program 12 saved in the ROM 11b, another memory, or the like by using the RAM 11c or the like as a work area, thereby controlling the sections of the printing apparatus 10. The processor is not limited to a single CPU but may have a configuration in which processing is performed by a plurality of CPUs or a hardware circuit such as an application specification integrated circuit (ASIC), or may have a configuration in which a CPU and a hardware circuit cooperate with each other to perform processing.

The first screen 13 and the second screen 15 are display sections for displaying visual information and, for example, are each formed of a liquid crystal display, an organic electroluminescent display, or the like. The display sections may include a display and a drive circuit for driving the display. The first operation receiving section 14 is a means for receiving an operation performed by a user who visually identifies the first screen 13, and is, for example, implemented by a physical button, a touch panel, or the like. Of course, the touch panel may be implemented as one function of the first screen 13. The second operation receiving section 16 is a means for receiving an operation performed by a user who visually identifies the second screen 15, and is, for example, implemented by a physical button, a touch panel, or the like. Of course, the touch panel may be implemented as one function of the second screen 15. The display of the first screen 13 and the display of the second screen 15 are controlled by the control section 11.

The transport section 19 is a mechanism that transports print media (hereafter referred to as media) under control by the control section 11. The transport section 19 includes a roller for transporting media, a motor for rotating the roller, and the like. The roller for transporting media may be referred to as a transport roller. The media is typically paper but may be media of a material other than paper so long as the material is printable.

The print head 17 discharges liquid, such as ink, by an ink jet method under control of the control section 11 to perform printing. The print head 17, which includes a plurality of nozzles capable of discharging liquid, discharges the liquid from nozzles based on image data onto media transported by the transport section 19. The print head 17 may be referred to as a printing head, a recording head, a liquid discharge head, or the like. The print head 17 is capable of discharging ink of a plurality of colors including cyan (C), magenta (M), yellow (Y), and black (K), for example.

Under control by the control section 11, the carriage 18 moves backwards and forwards along a direction intersecting the direction of transport by the transport section 19. The term "intersecting" as used herein basically means intersecting perpendicularly, which is not limited to meaning strictly perpendicularly but may have a meaning including errors that may occur, for example, due to the inaccuracy when parts are actually mounted. The print head 17 is mounted on the carriage 18 and moves together with the carriage 18. That is, the print head 17 discharges ink while moving with the carriage 18, thereby performing printing on media.

The communication IF 20 is a general term for one or more IFs to be used in order for the printing apparatus 10 to be coupled to the outside in a wired or wireless manner in conformity with a predetermined communication protocol including known telecommunication standards. The printing apparatus 10 communicates with an external apparatus, such as a personal computer (PC), a server, a smart phone, or a tablet computer, via the communication IF 18.

Figure 2:
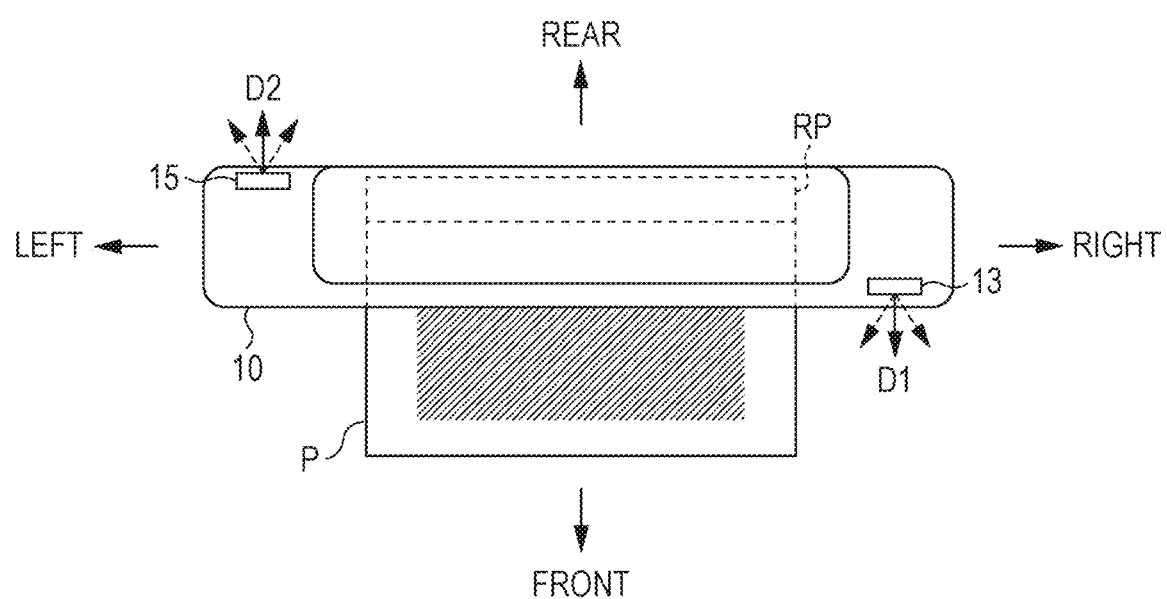
FIG. 2 illustrates a printing apparatus from the viewpoint from above.

FIG. 2 simply illustrates the printing apparatus 10 from the viewpoint from above. In the example in FIG. 2, the printing apparatus 10 is a so-called large format printer. A large format printer is, for example, a product suitable for generation of large-sized printed matter, such as a poster or outdoor advertising. For convenience, the directions for the printing apparatus 10 illustrated in FIG. 2 are described using "front", "rear", "left", and "right". In the example in FIG. 2, the external form of the printing apparatus 10 is laterally elongated. The moving direction of the carriage 18 is the left and right direction.

As indicated by a dashed line in FIG. 2, roll paper RP as media is set in the printing apparatus 10. One end of the roll paper RP is pulled out, and paper P, which is the pulled-out portion, is printed on by the print head 17 while being transported by the transport section 19. In the example in FIG. 2, the roll paper RP is set at a predetermined position close to the rear of the printing apparatus 10, and the paper P pulled out from the roll paper RP is transported from the rear toward the front. In FIG. 2, the slanted line pattern on the paper P discharged to the front of the printing apparatus 10 exemplifies a printed image.

The first screen 13 and the second screen 15 are individually mounted on the printing apparatus 10 so as to be visually identifiable from the outside. When the two screens included in the printing apparatus 10 are referred to as a first screen 13 and a second screen 15, either of these screens may be referred to as the first screen 13. In FIG. 2, a screen located closer to the front is referred to as the first screen 13, and a screen located closer to the rear is referred to as the second screen 15. A first direction D1 indicated by a solid-line arrow is a direction in which the first screen 13 faces. A second direction D2 indicated by a solid-line arrow is a direction in which the second screen 15 faces. The first direction D1 and the second direction D2 are different directions. In the example in FIG. 2, the first direction D1 is toward the front, and the second direction D2 is toward the rear. Therefore, it is easy for a user in front of the printing apparatus 10 to visually identify the first screen 13, and it is easy for a user behind the printing apparatus 10 to visually identify the second screen 15.

The relationship between the first direction D1 and the second direction D2 may or may not be such that the first direction D1 and the second direction D2 are opposite to each other as illustrated in FIG. 2. For example, as indicated by dotted-line arrows in the proximity of the first screen 13 in FIG. 2, the first direction D1 may be diagonally forward right or diagonally forward left. As indicated by dotted-line arrows in the proximity of the second screen 15 in FIG. 2, the second direction D2 may be diagonally rearward right or diagonally rearward left.

At least one of the first screen 13 and the second screen 15 may have a tilt function, allowing the orientation of a screen to be changed. The first direction D1 and the second direction D2 are not limited to being horizontal but may be inclined upward or downward with respect to the horizontal direction.

2. DISPLAY CONTROL PROCESS

Display control of the first screen 13 and the second screen 15 that is executed according to the program 12 by the control section 11 as a processor will now be described.

Figure 3:
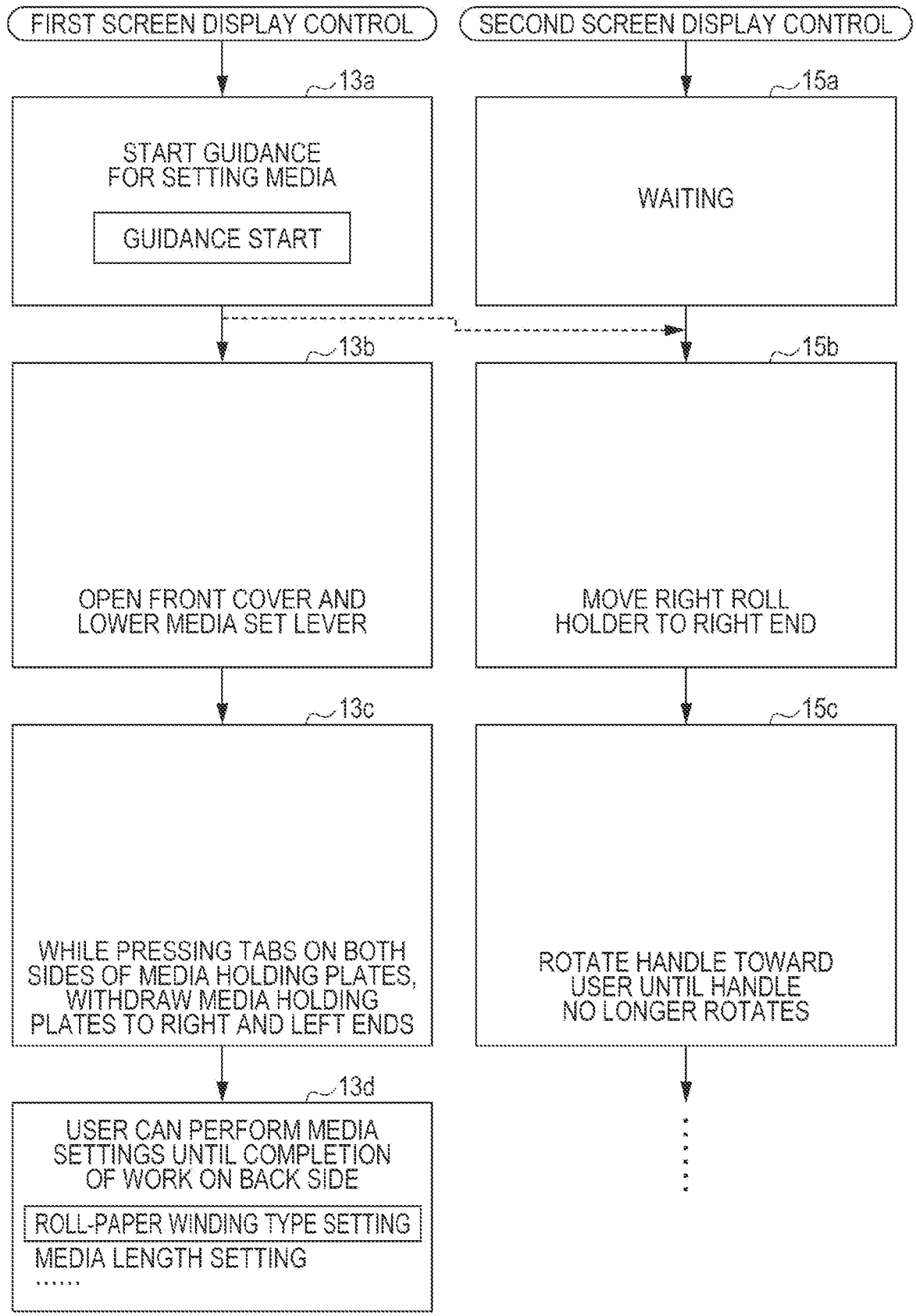
FIG. 3 is an illustration for explaining the flow of a display control process based on specific example.
Figure 4:
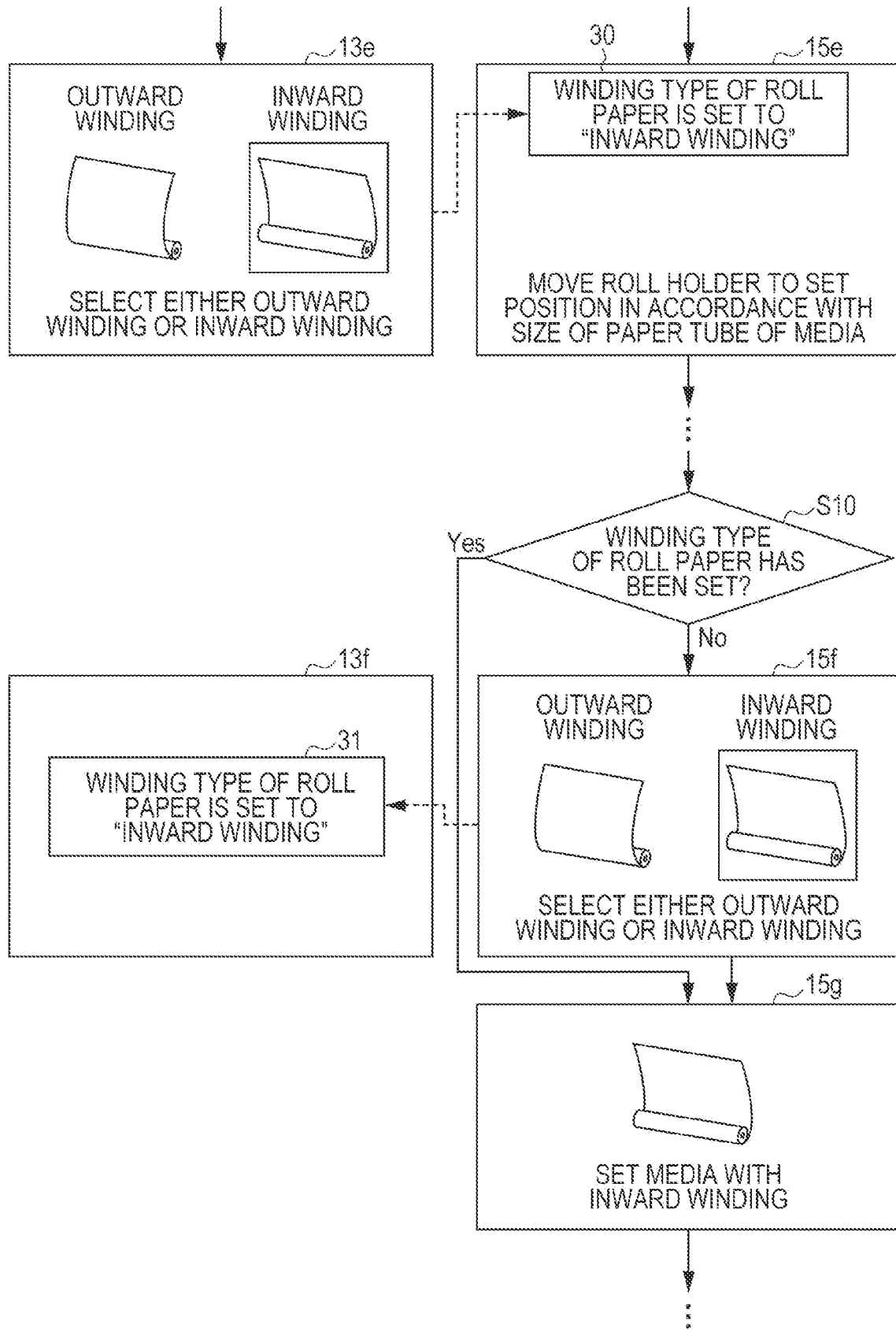
FIG. 4 is an illustration for explaining the flow of a display control process following the process in FIG. 3, based on a specific example.
Figure 5:
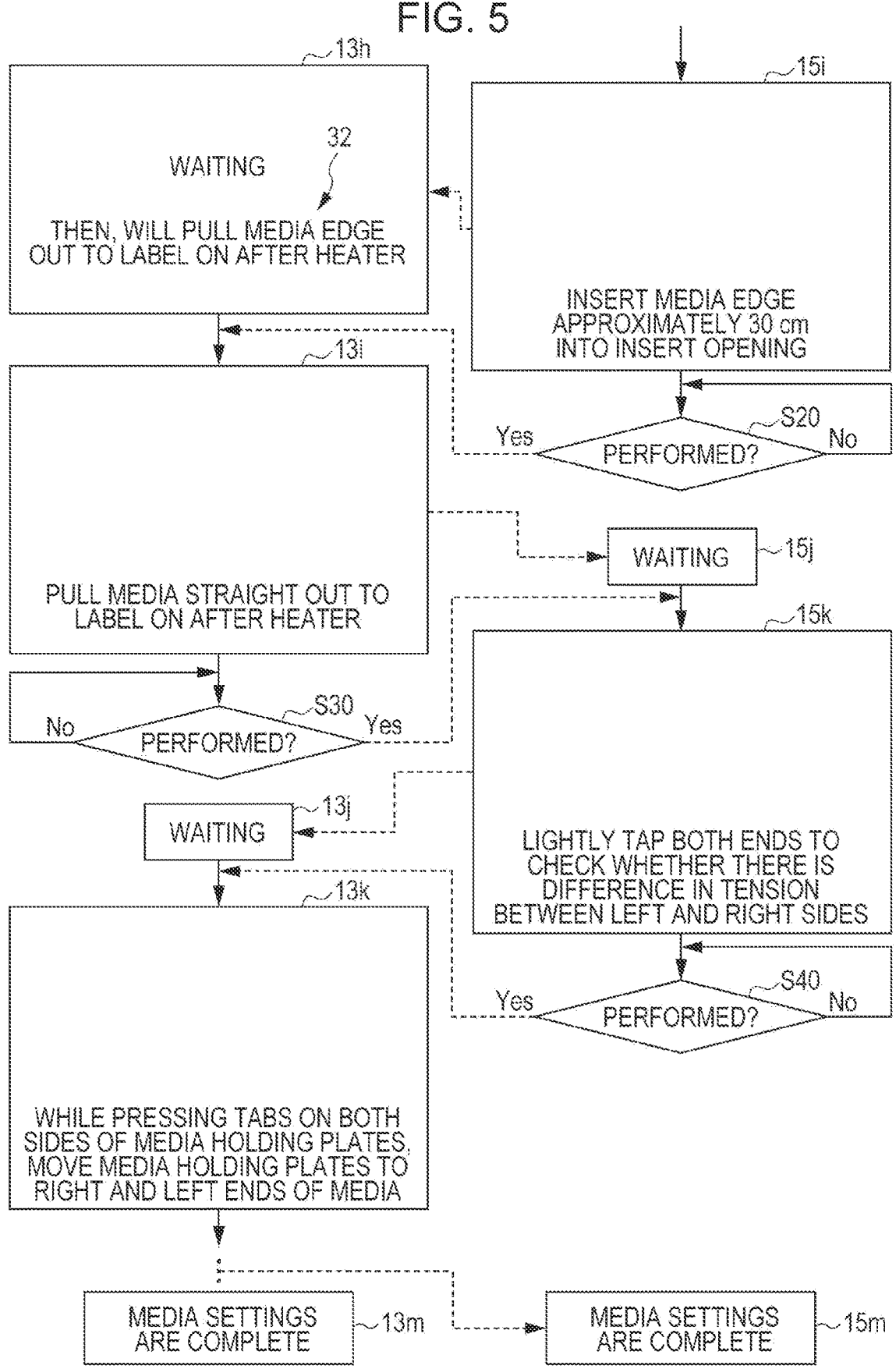
FIG. 5 is an illustration for explaining the flow of a display control process following the process in FIG. 4, based on a specific example.

FIGS. 3, 4, and 5 are illustrations for explaining the flow of such a display control process based on a specific example. In FIGS. 3, 4, and 5, first images 13 and the like displayed on the first screen 13 are illustrated on the left in the drawings, and second images 15 and the like displayed on the second screen 15 are illustrated on the right in the drawings.

An image displayed on the first screen 13 by the control section 11 is referred to as a first image. The content of the first image is variable. An image displayed on the second screen 15 by the control section 11 is referred to as a second image. The content of the second image is variable. With reference to FIGS. 3, 4, and 5, description is given of a display control process for providing guidance on work for two users to set the roll paper RP in the printing apparatus 10. A user who visually identifies the first screen 13 and performs actions and operations of the first operation receiving section 14 is referred to as a first user. A user who visually identifies the second screen 15 and performs actions and operations of the second operation receiving section 16 is referred to as a second user.

In response to a predetermined operation performed by the first user, as illustrated in FIG. 3, the control section 11 displays a first image 13a on the first screen 13. The first image 13a includes, for example, a message to the effect that guidance for setting the rolled paper RP, that is, media, will start, and a button for receiving an instruction for start of the guidance. The first image 13a may be referred to as a guidance start image. The first user selects and operates the button to start the guidance. In response to receiving the operation of the button for start of the guidance, the control section 11 displays, on the first screen 13, a first image 13b that provides guidance on actions to the first user, and displays, on the second screen 15, a second image 15b that provides guidance on an action to the second user.

In the example in FIG. 3, before displaying the second image 15b on the second screen 15, the control section 11 displays a second image 15a, which instructs a user to wait, on the second screen 15. Such an image as the second image 15a may be referred to as a standby image. However, the control section 11 may display a guidance start image on both the first screen 13 and the second screen 15, and display the first image 13b on the first screen 13 and display the second image 15b on the second screen 15 when an instruction for start of guidance is received through the guidance start image of either the first screen 13 or the second screen 15.

The first image and the second image include character strings, illustrations, photographic images, and the like as desired. Additionally, the first image and the second image may be videos. That is, some of the first images and the second images denoted by the reference characters in FIGS. 3, 4, and 5 may be understood as typical frames in videos displayed on the first screen 13 and videos displayed on the second screen 15.

The first image 13b is, for example, an image that guides the first user to perform actions of opening the front cover of the printing apparatus 10 and lowering a media setting lever, by using a photographic image and a message. The media setting lever is a lever for pressing the paper P, which is pulled out from the roll paper RP, with a certain force, and the pressing force can be decreased by lowering the lever.

After displaying the first image 13b, the control section 11 displays a first image 13c on the first screen 13. The first image 13c is, for example, an image that guides the first user to perform an action of withdrawing media holding plates to the right and left ends, by using a photographic image and a message. The media holding plates are plates for regulating the positions of right and left ends of the paper P pulled out from the roll paper RP, and is capable of being withdrawn in order to keep out of the way of work of media settings.

After displaying the first image 13c, the control section 11 displays a first image 13d on the first screen 13. The first image 13d is, for example, an image that provides, to the first user, guidance to the effect that the first user is allowed to perform various settings regarding media while waiting for a certain stage of work on the back side, that is, a certain stage of work of the second user behind the printing apparatus 10 to be completed. Additionally, in the first image 13d, for example, a plurality of items, such as a roll-paper winding type setting and a media length setting, are described, and the first user may arbitrarily select these items. In the example in FIG. 3, the first user is assumed to select the item "roll-paper winding type setting" in the first image 13d.

The respective actions of the user guided by the first images 13b, 13c, and 13d as described correspond to examples of the "first action".

In response to the fact that the item of the roll-paper winding type setting is selected in the first image 13d, as illustrated in FIG. 4, the control section 11 displays, on the first screen 13, a first image 13e for receiving the setting of the winding type of roll paper. The setting of the winding type of roll paper is a setting for determining whether the side to be printed is the outer side (outward winding) or the inner side (inward winding) of the roll paper RP. The first user may arbitrarily select and set either the outward winding or the inward winding by performing an operation on the first image 13e.

The second image 15b in FIG. 3 is, for example, an image that guides the second user to perform an action of moving a right roll holder to the right end, by using a photographic image and a message. The roll holder is a mechanism for supporting the paper tube of the roll paper RP from both the edges. Incidentally, "right" in the guidance of the second image 15b is assumed to be right when the second user behind the printing apparatus 10 looks ahead, and therefore corresponds to "left" of front, rear, left, and right indicated in FIG. 2.

After displaying the second image 15b, the control section 11 displays a second image 15c on the second screen 15. The second image 15c is, for example, an image that guides the second user to perform actions of rotating a handle for operating a roll holder in a certain direction, by using a photographic image and a message. Although not illustrated in the figure as appropriate, even after displaying the second image 15c, the control section 11 sequentially displays second images for guiding, to the second user, actions to be performed for the process of setting the roll paper RP. A second image 15e in FIG. 4 is an example of the second images displayed on the second screen 15 after the second image 15c as described.

The second image 15e is, for example, an image that guides the second user to perform actions of moving a roll holder opposite to the roll holder illustrated in the second image 15b to a position in accordance with the size of the paper tube of the roll paper RP, by using a photographic image and messages.

Each of actions of the user guided by the second images 15b, 15c, and 15e as described above and a second image 15g described later corresponds to an example of the "second action".

The control section 11 displays the first image on the first screen 13 and, simultaneously, displays the second image on the second screen 15. Displaying the first image and the second image simultaneously means that a time period for displaying the first image and a time period for displaying the second image overlap in part or in whole. The first action in the guidance provided by the first image and the second action in the guidance provided by the second image may be performed in parallel by the first user and the second user. That is, the first action in the guidance provided by the first image and the second action in the guidance provided by the second image are actions configured to be performed simultaneously.

The display of the first image on the first screen 13 for guiding each first action may be automatically switched or may be manually switched by the first user. Likewise, the display of the second image on the second screen 15 for guiding each second action may be automatically switched or may be manually switched by the second user.

At this point, the control section 11 displays, on the second screen 15, a setting notification 30 for notifying the second user of the setting received via the first image 13e. In the example in FIG. 4, "inward winding" is selected in the first image 13e. Therefore, the control section 11 displays, on the second screen 15, the setting notification 30 such as a message notifying that inward winding is set as the winding type of roll paper. In the example in FIG. 4, the setting notification 30 is displayed to be superimposed on the second image 15e. That is, at the time point at which the control section 11 receives the setting "inward winding" via the first image 13e, the second image currently displayed on the second screen 15 is by chance the second image 15e, and therefore the control section 11 displays the superimposed setting notification 30 within the second image 15e.

At a certain timing after the timing at which the control section 11 displays the second image 15e on the second screen 15, the control section 11 determines whether the winding type of roll paper has been set (step S10). The certain timing as used herein refers to, for example, a timing at which the guidance for the second actions to be performed by the second user, prior to the action of attaching the roll paper RP to a roll holder, is completed by displaying the second image. The control section 11 determines "Yes" at the time point of step S10 if the control section 11 has already received the setting of the winding type of roll paper via the first image 13e on the first screen 13. However, the control section 11 determines "No" at the time point of step S10 if the control section 11 has not received the setting of the winding type of roll paper via the first screen 13.

If "Yes" is determined in step S10, the control section 11 displays, on the second screen 15, a second image 15g that provides guidance for mounting the roll paper RP on the printing apparatus 10 in an orientation in accordance with the winding type of roll paper, which has been received via the first image 13e on the first screen 13. If, however, "No" is determined in step S10, the control section 11 displays, on the second screen 15, a second image 15f for receiving a setting of the winding type of roll paper. As understood from FIG. 4, the first image 13e and the second image 15f are substantially the same image. The second user may arbitrarily select and set either the outward winding or the inward winding by performing an operation on the second image 15f.

The control section 11 displays, on the first screen 13, a setting notification 31 for notifying the first user of the setting received via the second image 15f. In the example in FIG. 4, "inward winding" is selected in the second image 15f. Therefore, the control section 11 displays, on the first screen 13, the setting notification 31 such as a message notifying that inward winding is set as the winding type of roll paper. In the example in FIG. 4, the setting notification 31 is displayed to be superimposed on a first image 13f. That is, at the time point at which the control section 11 receives the setting "inward setting" via the second image 15f, the first image currently displayed on the first screen 13 is by chance the first image 13f, and therefore the control section 11 displays the superimposed setting notification 31 within the first image 13f.

In FIG. 4, for the first image 13f, the content other than the setting notification 31 displayed in a superimposed manner is omitted. It is not important at this point what guidance the first image 13f originally provides to the first user. The first image 13f may be interpreted to be, for example, the first image 13c illustrated in FIG. 3.

When receiving the setting of the winding type of roll paper via the second image 15f on the second screen 15, the control section 11 displays, on the second screen 15, a second image 15g that provides guidance for mounting the roll paper RP on the printing apparatus 10 in an orientation in accordance with the received winding type of roll paper.

According to the description with reference to FIG. 4 as described above, the setting of the winding type of roll paper corresponds to an example of "first setting" that the control section 11 is configured to receive from either of the first screen 13 and the second screen 15. When receiving the first setting via the second screen 15 before receiving the first setting via the first screen 13, the control section 11 displays, on the first screen 13, the first image notifying a user of the first setting received via the second screen 15, that is, the first image including the setting notification 31. In contrast, when receiving the first setting via the first screen 13 before receiving the first setting via the second screen 15, the control section 11 displays, on the second screen 15, the second image notifying a user of the first setting received via the first screen 13, that is, the second image including the setting notification 30.

After displaying the second image 15g, the control section 11 displays a second image 15i on the second screen 15 as illustrated in FIG. 5. The second image 15i is, for example, an image that guides the second user to perform an action of inserting the edge of the roll paper RP supported by a roll holder into an insert opening, by using a photographic image and a message.

The first action of the first user and the second action of the second user are actions capable of being performed independently to each other, regardless of the respective states of progress. In contrast, the action of the first user and the action of the second user described with reference to FIG. 5 are actions to be performed alternately. During a time period when the control section 11 displays the second image 15i on the second screen 15, the control section 11 displays, on the first screen 13, a first image 13h, which is a standby image.

While displaying the second image 15i on the second screen 15, the control section 11 repeatedly determines whether the action on which guidance is provided by the second image 15i has been performed (step S20). When the second user performs the action on which guidance is provided by the second image 15i, the second user operates the second operation receiving section 16 to press a predetermined execution completion button, thereby notifying the control section 11 that the action on which guidance is provided by the second image 15i has been performed. When receiving, from the second user, the notification to the effect that the action on which guidance is provided by the second image 15i has been performed, the control section 11 determines "Yes" in step S20. Alternatively, when, based on an output from a sensor (not illustrated) mounted on the printing apparatus 10, the control section 11 detects that the action on which guidance is provided by the second image 15i has been performed, the control section 11 may determine "Yes" in step S20.

If "Yes" is determined in step S20, the control section 11 switches the display of the first screen 13 from the first image 13h, which is the standby image, to a first image 13i. The first image 13i is, for example, an image that guides the first user to perform an action of pulling out the edge of the roll paper RP, which has been inserted from behind into the printing apparatus 10, forward to a certain position, by using a photographic image and a message. During a time period when the control section 11 displays the first image 13i on the first screen 13, the control section 11 displays, on the second screen 15, a second image 15j, which is a standby image. In FIG. 5, for reasons of space, some second images, such as the second image 15j, and first images are drawn to a reduced scale. This does not mean that such images are actually displayed as reduced-size images.

While displaying the first image 13i on the first screen 13, the control section 11 repeatedly determines whether the action on which guidance is provided by the first image 13i has been performed (step S30). In the determination in step S30, the control section 11 determines "Yes" when receiving, from the first user, a notification to the effect that the action on which guidance is provided by the first image 13i has been performed, or when detecting, based on an output from a sensor (not illustrated), that the action on which guidance is provided by the first image 13i has been performed.

If "Yes" is determined in step S30, the control section 11 switches the display of the second screen 15 from the second image 15j, which is the standby image, to a second image 15k. The second image 15k is, for example, an image that guides the second user to lightly tap both ends of the paper P pulled out from the roll paper RP from behind the printing apparatus 10 to check whether there is a difference in tension of the paper P between the left and right sides, by using a photographic image and a message. When there is a difference in tension of the paper P between the left and right sides, the second user can recognize that the paper P is not pulled out straight, that is, the paper P is inclined with respect to the transport direction. During a time period when the control section 11 displays the second image 15k on the second screen 15, the control section 11 displays, on the first screen 13, a first image 13j, which is a standby image.

While displaying the second image 15k on the second screen 15, the control section 11 repeatedly determines whether an action on which guidance is provided by the second image 15k has been performed (step S40). When the second user lightly taps both ends of the paper P and checks that there is no difference in tension between the left and right sides, the second user notifies the control section 11 that the action on which guidance is provided by the second image 15k has been performed. When the control section 11 receives, from the second user, the notification to the effect that the action on which guidance is provided by the second image 15k has been performed, the control section 11 determines "Yes" in step S40. Alternatively, when, based on an output from a sensor (not illustrated) mounted on the printing apparatus 10, the control section 11 detects that the paper P is not skewed, the control section 11 may determine "Yes" in step S40.

Although not illustrated in the figure, when, during the determination in step S40, the control section 11 receives, from the second user, a notification to the effect that there is a difference in tension of the paper P between the left and right sides, or detects, by using a sensor, that the paper P is skewed, the control section 11 may display, on the first screen 13, a first image that guides the first user to perform an action for removing the skew of the paper P. When, after displaying, on the first screen 13, the first image that guides the first user to perform an action for removing the skew of the paper P, the control section 11 receives, from the first user, a notification to the effect that the action on which guidance is provided by the first image 13 has been performed, the control section 11 may display the second image 15k again on the second screen 15 and make a determination in step S40.

If "Yes" is determined in step S40, the control section 11 switches the display of the first screen 13 from the first image 13j, which is the standby image, to a first image 13k. The first image 13k is, for example, an image that guides the first user to move the media holding plates to positions for regulating both ends of the paper P pulled out from the roll paper RP, by using a photographic image and a message. After displaying the first image 13k, for example, the control section 11 further displays, on the first screen 13, a first image that guides the first user to perform an action of returning the lowered media setting lever to the original position and an action of closing the front cover, and then displays a first image 13m on the first screen 13 and displays a second image 15m on the second screen 15. The first image 13m and the second image 15m are images that notify the first user and the second user that setting of the roll paper RP to the printing apparatus 10 is complete.

Actions that the first user does not perform concurrently with actions of the second user, as described with reference to FIG. 5, are referred to as a third action and a fifth action. Additionally, an action that the second user does not perform concurrently with an action of the first user is referred to as a fourth action. The actions on which guidance is provided by the first images 13i and 13k correspond to specific examples of the third action and the fifth action, respectively. Additionally, the action on which guidance is provided by the second image 15k corresponds to a specific example of the fourth action.

According to the description with reference to FIG. 5 as described above, the control section 11 displays, on the first screen 13, the first image that provides guidance on the third action to a user and, simultaneously, displays, on the second screen 15, the second image that instructs another user to wait, and, in response to performing of the third action, displays, on the second screen 15, the second image that provides guidance on the fourth action to the other user. Additionally, the control section 11 displays, on the second screen 15, the second image that provides guidance on the fourth action to a user and, simultaneously, displays, on the first screen 13, the first image that instructs another user to wait, and, in response to performing of the fourth action, displays, on the first screen 13, the first image that provides guidance on a fifth action to the other user.

The third action, the fourth action, and the fifth action are merely common names for identifying actions, and the numbers used for the common names may not be understood as representing the order of actions. For example, the action on which guidance is provided by the second image 15i may be referred to as the fourth action, and the action on which guidance is provided by the first image 13i may be referred to as the third action. In this case, it may be said that the control section 11 displays, on the second screen 15, the second image that provides guidance on the fourth action to a user and, simultaneously, displays, on the first screen 13, the first image that instructs a user to wait, and, in response to performing of the fourth action, displays, on the first screen 13, the first image that provides guidance on the third action to a user.

In FIG. 5, a message 32 included in the first image 13h, which is one of the standby images, is a display that provides, as advance notice, guidance on an action to be performed by the first user after waiting indicated by the first image 13h, that is, an action on which guidance is provided by the first image 13i. The control section 11 may display not only the first image 13h but also the first image 13j and the second image 15j, which are the other standby images, such that such an image includes a display that provides guidance on an action of a user after waiting has been completed.

3. OTHER EMBODIMENTS

The display control process according to the present embodiment is applicable to scenes other than the scene where guidance on work of setting the roll paper RP to the printing apparatus 10 is provided to users. For examples, the present embodiment that controls the displays on the first screen 13 and the second screen 15 may be applied to the case where guidance on replacement work of ink cartridges mounted on the printing apparatus 10 is provided to users and the case where guidance on maintenance and cleaning work of various parts included in the printing apparatus 10 is provided to users. Alternatively, the present embodiment may be applied to the case where guidance on work, such as initial setting and an operation check, for a purchased product is provided to users.

Assuming that the scenes to which the present embodiment is applicable are various, the positions and orientations of the first screen 13 and the second screen 15 are not limited to the manners described above.

For example, either one of the first direction D1, which is the direction in which the first screen 13 faces, and the second direction D2, which is the direction in which the second screen 15 faces, may be toward the right, and the other may be toward the left.

Figure 6A:
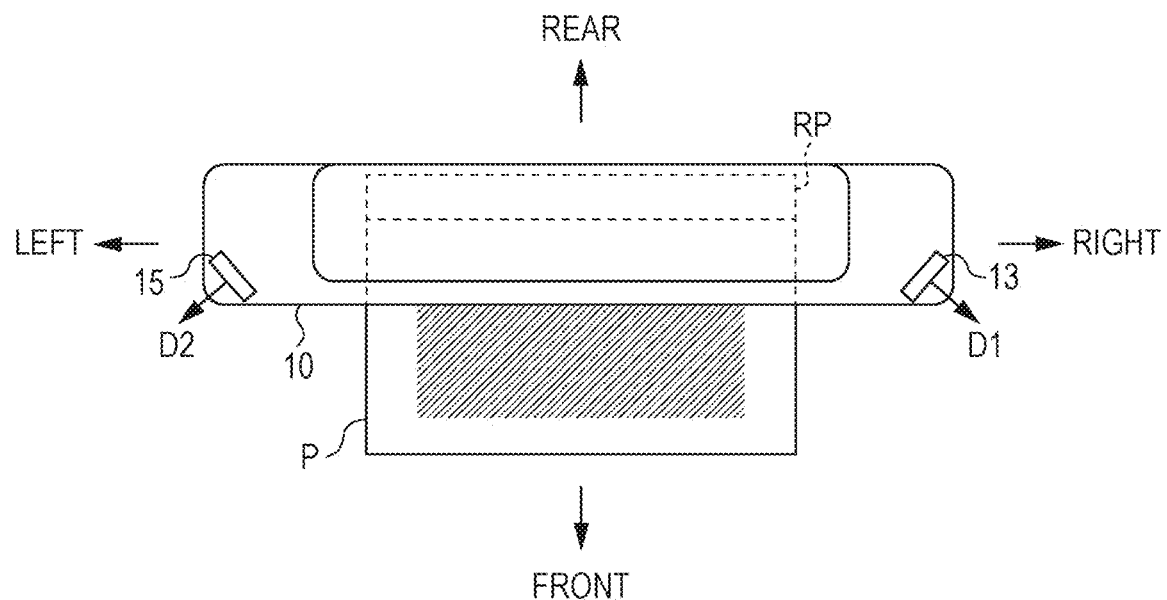
FIG. 6A illustrates an example of a printing apparatus including two screens at positions different from those in FIG. 2, from the viewpoint from above.
Figure 6B:
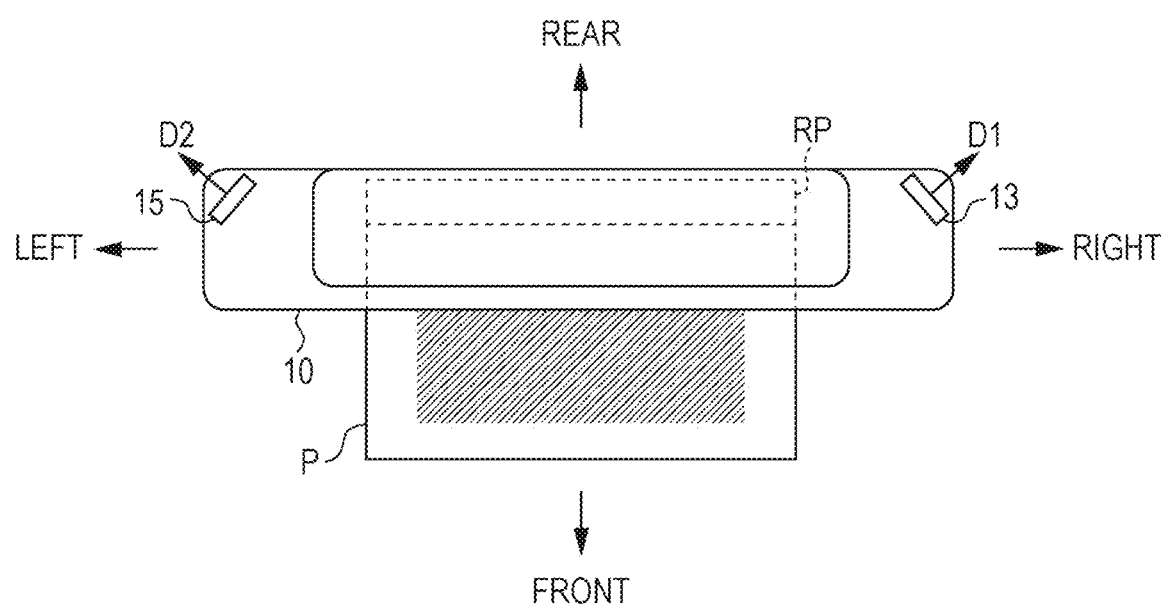
FIG. 6B illustrates another example of a printing apparatus including two screens at positions different from those in FIG. 2, from the viewpoint from above.

FIG. 6A and FIG. 6B individually illustrate the printing apparatus 10 from the viewpoint from above. The viewpoint of FIGS. 6A and 6B is the same as the viewpoint of FIG. 2. FIGS. 6A and 6B individually illustrate examples of the positions and orientations of the first screen 13 and the second screen 15.

As in the example in FIG. 6A, both the first screen 13 and the second screen 15 may be mounted at positions close to the front of the printing apparatus 10. For example, the first screen 13 is mounted at a position in the front right end of the printing apparatus 10, and the second screen 15 is mounted at a position in the front left end of the printing apparatus 10. In FIG. 6A, the first direction D1 is diagonally frontward right, and the second direction D2 is diagonally frontward left.

As in the example in FIG. 6B, both the first screen 13 and the second screen 15 may be mounted at positions close to the rear of the printing apparatus 10. For example, the first screen 13 is mounted at a position in the rear right end of the printing apparatus 10, and the second screen 15 is mounted at a position in the front left end of the printing apparatus 10. In FIG. 6B, the first direction D1 is diagonally rearward right, and the second direction D2 is a diagonally rearward left.

The print head 17 is not limited to moving with the carriage 18. That is, the print head 17 may be a line head that is elongated in the left and right direction, and, in its stationary state, may discharge ink to the transported paper P.

The printing method employed by the printing apparatus 10 is not limited to an ink jet method. The printing apparatus 10 may be, for example, a product that performs printing by an electrophotography method, a thermal method, or a dot impact method.

4. CONCLUSION

According to the present embodiment as described above, the printing apparatus 10 includes the first screen 13 facing in the first direction D1, the second screen 15 facing in the second direction D2 different from the first direction D1, and a processor (the control section 11) that controls display of the first screen 13 and display of the second screen 15. The processor performs control for displaying a first image on the first screen 13 and, simultaneously, displaying a second image on the second screen 15. A first action of a user on which guidance is provided by the first image and a second action of a user on which guidance is provided by the second image are actions configured to be performed simultaneously.

According to the configuration mentioned above, the processor may execute displaying, on the first screen 13, the first image that provides guidance on the first action and, simultaneously, displaying, on the second screen 15, the second image that provides guidance on the second action. Thereby, the first action by a user who visually identifies the first screen 13 and the second action by a user who visually identifies the second screen 15 are performed in parallel, and the progress of the entire actions including the first action and the second action is made effective. For example, in the case where two persons set the roll paper RP to the printing apparatus 10, the first user visually identifies the first image on the first screen 13 and performs the first action and, in parallel, the second user visually identifies the second image on the second screen 15 and performs the second action, thereby completing the work of setting the roll paper RP in a shorter time period. Additionally, both the user who visually identifies the first screen 13 and the user who visually identifies the second screen 15 may perform necessary actions accurately.

In addition, according to the present embodiment, for a first setting that the processor is configured to receive from either of the first screen 13 and the second screen 15, when receiving the first setting via the second screen 15 before receiving the first setting via the first screen 13, the processor displays, on the first screen 13, the first image notifying a user of the first setting received via the second screen 15. In contrast, when receiving the first setting via the first screen 13 before receiving the first setting via the second screen 15, the processor displays, on the second screen 15, the second image notifying a user of the first setting received via the first screen 13.

According to the configuration mentioned above, one of the user who visually identifies the first screen 13 and the user who visually identifies the second screen 15 may confirm, on the screen visually identified by himself, the first setting performed by the other.

In addition, according to the present embodiment, the processor displays, on the first screen 13, the first image that provides guidance on a third action to a user and, simultaneously, displays, on the second screen 15, the second image that instructs another user to wait, and, in response to performing of the third action, displays, on the second screen 15, the second image that provides guidance on a fourth action to the other user.

In addition, according to the present embodiment, the processor displays, on the second screen 15, the second image that provides guidance on the fourth action to a user and, simultaneously, displays, on the first screen 13, the first image that instructs another user to wait, and, in response to performing of the fourth action, displays, on the first screen 13, the first image that provides guidance on a fifth action to the other user.

According to these configurations, in response to the fact that an action on which guidance is provided on the first screen is performed, the processor provides guidance on an action on the second screen. In response to the fact that the action on which guidance is provided on the second screen is performed, the processor provides guidance on an action on the first screen. Thereby, a user who visually identifies the first screen and a user who visually identifies the second screen may alternately perform their respective actions efficiently.

In addition, according to the present embodiment, the image that instructs a user to wait may include a display that provides guidance on an action of the user after waiting has been completed.

According to the configuration mentioned above, during a time period when the user is instructed to wait, the user may recognize in advance an action to be performed after waiting has been completed.

The display control process executed by the printing apparatus 10 may be perceived as disclosure of a method. In addition, the program 12 that causes the processor to execute such a display control process may be perceived as disclosure.

In addition, according to the present embodiment, a method for operating a printing apparatus utilizing a law of nature is disclosed by using the process with the printing apparatus 10 and actions of users. According to a method for operating a printing apparatus, performing, by a first user, on the printing apparatus 10, a first action on which guidance is provided by the first screen 13, which is included in the printing apparatus 10 and faces in the first direction D1, and performing, by a second user, on the printing apparatus 10, a second action on which guidance is provided by the second screen 15, which is included in the printing apparatus 10 and faces in the second direction D2 different from the first direction D1, are included. The first action and the second action are performed simultaneously.

In addition, performing, by the first user, on the printing apparatus 10, the first action on which guidance is provided by the first screen 13 may be expressed as receiving, by the printing apparatus 10, from the first user, the first action on which guidance is provided by the first screen 13. Similarly, performing, by the second user, on the printing apparatus 10, the second action on which guidance is provided by the second screen 15 may be expressed as receiving, by the printing apparatus 10, from the second user, the second action on which guidance is provided by the second screen 15.

What is claimed is:

1. A printing apparatus comprising:
    a first screen facing in a first direction;
    a second screen facing in a second direction different from the first direction; and
    a processor that controls display of the first screen and display of the second screen, wherein
    the processor performs control for displaying a first image on the first screen and, simultaneously, displaying a second image on the second screen, and
    a first action of a user on which guidance is provided by the first image and a second action of a user on which guidance is provided by the second image are actions configured to be performed simultaneously.

2. The printing apparatus according to claim 1, wherein
    for a first setting that the processor is configured to receive from either of the first screen and the second screen,
    when receiving the first setting via the second screen before receiving the first setting via the first screen, the processor displays, on the first screen, the first image notifying a user of the first setting received via the second screen, and
    when receiving the first setting via the first screen before receiving the first setting via the second screen, the processor displays, on the second screen, the second image notifying a user of the first setting received via the first screen.

3. The printing apparatus according to claim 1, wherein the processor displays, on the first screen, the first image that provides guidance on a third action to a user and, simultaneously, displays, on the second screen, the second image that instructs another user to wait, and, in response to performing of the third action, displays, on the second screen, the second image that provides guidance on a fourth action to the other user.

4. The printing apparatus according to claim 3, wherein the processor displays, on the second screen, the second image that provides guidance on the fourth action to a user and, simultaneously, displays, on the first screen, the first image that instructs another user to wait, and, in response to performing of the fourth action, displays, on the first screen, the first image that provides guidance on a fifth action to the other user.

5. The printing apparatus according to claim 3, wherein the second image that instructs a user to wait includes a display that provides guidance on an action of the user after waiting was completed.

6. A method for operating a printing apparatus, comprising:
    by a first user, performing, on a printing apparatus, a first action on which guidance is provided by a first screen included in the printing apparatus, the first screen facing in a first direction; and
    by a second user, performing, on the printing apparatus, a second action on which guidance is provided by a second screen included in the printing apparatus, the second screen facing in a second direction different from the first direction, wherein
    the first action and the second action are performed simultaneously.

* * * * *